United States Patent
Rodrigues Camilo et al.

(10) Patent No.: US 11,015,035 B2
(45) Date of Patent: May 25, 2021

(54) FOAM COMPOSITION WITH IMPROVED PROPERTIES AND APPLICATIONS THEREOF

(71) Applicant: Braskem S.A., Camaçari (BR)

(72) Inventors: Ana Paula Rodrigues Camilo, São Paulo (BR); Giancarlos Delevati, São Paulo (BR); Gislene Zehetmeyer, São Paulo (BR); Mauro Alfredo Soto Oviedo, São Paulo (BR)

(73) Assignee: Braskem S.A., Camaçari (BR)

(*) Notice: Subject to any disclaimer, the term of this patent is extended or adjusted under 35 U.S.C. 154(b) by 59 days.

(21) Appl. No.: 16/180,978

(22) Filed: Nov. 5, 2018

(65) Prior Publication Data

US 2019/0136006 A1 May 9, 2019

Related U.S. Application Data

(60) Provisional application No. 62/581,748, filed on Nov. 5, 2017.

(51) Int. Cl.
| | |
|---|---|
| *C08J 9/228* | (2006.01) |
| *C08L 31/04* | (2006.01) |
| *C08J 9/00* | (2006.01) |
| *C08K 5/00* | (2006.01) |

(52) U.S. Cl.
CPC ............. *C08J 9/228* (2013.01); *C08J 9/0052* (2013.01); *C08K 5/0016* (2013.01); *C08L 31/04* (2013.01); *C08J 9/0023* (2013.01); *C08J 9/0061* (2013.01); *C08J 2205/06* (2013.01); *C08J 2205/10* (2013.01); *C08J 2323/08* (2013.01); *C08J 2331/04* (2013.01); *C08J 2423/08* (2013.01); *C08J 2483/04* (2013.01); *C08L 2203/14* (2013.01)

(58) Field of Classification Search
CPC ...... C08J 9/0052; C08J 9/228; C08J 2205/06; C08J 2205/10; C08J 2323/08; C08J 2331/04; C08J 2423/08; C08J 2483/04; C08J 9/0023; C08J 9/0061; C08K 5/0016; C08L 31/04; C08L 2203/14

See application file for complete search history.

(56) References Cited

U.S. PATENT DOCUMENTS

| | | | | |
|---|---|---|---|---|
| 6,111,020 | A | * | 8/2000 | Oriani ..................... C08L 23/08 521/144 |
| 2002/0183408 | A1 | | 12/2002 | Sueda et al. |
| 2005/0154089 | A1 | | 7/2005 | Taylor et al. |
| 2015/0031838 | A1 | | 1/2015 | Li et al. |
| 2015/0315349 | A1 | * | 11/2015 | Tippet ..................... C08L 23/12 521/97 |
| 2016/0237239 | A1 | | 8/2016 | Cortes et al. |

FOREIGN PATENT DOCUMENTS

| | | |
|---|---|---|
| BR | 102012025160 A2 | 11/2013 |
| CA | 2111055 A1 | 7/1994 |
| EP | 1 557 453 A2 | 7/2005 |
| EP | 2 998 346 A1 | 3/2016 |

OTHER PUBLICATIONS

Classification of ethylene-styrene interpolymers based on comonomer content by Chen et al., Journal of Applied Polymer Science / vol. 70, Issue 1, 1998.*
International Search Report and Written Opinion dated Jan. 24, 2019, issued by the European Patent Office in corresponding International Application No. PCT/IB2018/001224 (12 pages).

* cited by examiner

*Primary Examiner* — Irina S Zemel
(74) *Attorney, Agent, or Firm* — Osha Bergman Watanabe & Burton LLP

(57) ABSTRACT

Foamed compositions that include: one or more foamable polymers; one or more ionomeric additives; and wherein the foam composition exhibits shrinkage as determined at 70° C.*1 h according to the PFI method between 0.1 and 3.5%. Methods may include preparing a polymer composition by combining one or more foamable polymers and one or more ionomeric additives in a mixer to produce the polymer composition; and foaming the polymer composition to generate a polymer foam exhibiting shrinkage as determined at 70° C.*1 h according to the PFI method of between 0.1 and 3.5%.

22 Claims, No Drawings

FOAM COMPOSITION WITH IMPROVED PROPERTIES AND APPLICATIONS THEREOF

BACKGROUND

Foamed polymer compositions are useful in a number of applications such as molding processes including extrusion molding, injection molding, compression molding, thermoforming, foaming, rotomolding, pultrusion, 3D printing, and the like, to produce manufactured articles. However, many polymers employed in foam production often require processing modifications or admixture with additives to account for material shrinkage, insufficient hardness, and changes in clarity, curing temperature, shelf stability, and ability to absorb paints and pigment, and other properties that occur during foaming.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to foamed compositions that include: one or more foamable polymers; one or more ionomeric additives; and wherein the foam composition exhibits shrinkage as determined at 70° C.*1 h according to the PFI method between 0.1 and 3.5%.

In another aspect, embodiments disclosed herein are directed to methods of preparing a polymer composition that include: combining one or more foamable polymers and one or more ionomeric additives in a mixer to produce the polymer composition; and foaming the polymer composition to generate a polymer foam exhibiting shrinkage as determined at 70° C.*1 h according to the PFI method of between 0.1 and 3.5%.

Other aspects and advantages of the claimed subject matter will be apparent from the following description and the appended claims.

DETAILED DESCRIPTION

In one aspect, embodiments disclosed herein relate to foamed polymer compositions formulated with an ionomeric additive that functions to reduce shrinkage, expansion loss, and tendency of the final material to collapse. In one or more embodiments, polymer compositions include foamable polymers such as ethylene vinyl acetate (EVA) copolymers with improved shrinkage properties when compared to the respective unmodified polymer. In some embodiments, polymer compositions in accordance with the present disclosure may exhibit a reduced shrinkage of foam during processing, in some cases reducing the shrinkage to about 2% or 1%, or less.

Shrinkage of injected, compressed and compounded polymer materials may affect both compositional factors such as physical properties of additives and polymers in the composition, and processing factors such as effective molding conditions and post-molding treatments to obtain the desired final product. In this way, material shrinkage has a direct impact on the properties of produced foams. For example, shrinkage can affect the hardness of a foam, and impact user comfort when formulated as a foam sole.

Polymer compositions in accordance with the present disclosure may combine an ionomeric additive with a foamable polymer during formulation and/or foam generation, which may result in an expanded polymeric foam having improved solubility parameters and improved dispersion of foaming agents within the polymer during foaming. Improved foam generation may also lead to increase homogeneity of cell size distributions. Foamed polymer compositions produced may also exhibit low shrinkage and improved permanent compression set (PCS) when compared to similar compositions formulated without the ionomeric additive.

In one or more embodiments, polymer compositions formulated with foamable polymers such as EVA and an ionomeric additive may exhibit modified rheological properties. For example, polymer compositions containing EVA that have been modified with an ionomeric additive may exhibit elevated viscosity at low frequencies, a characteristic that is similar to long chain branching formation. Without being limited to a particular theory, the ionomeric additive may interact with acetate functionality of EVA creating intermolecular complexes imitating long chain branching, which may lead to a higher elongational viscosity that allows the formation of cells with less defects (lessened tendency to deform during expansion) improving the cell size distribution.

Polymer compositions containing ionomeric additives may also be combined with additional polymers such as elastomers, including hydrogenated nitrile rubber, polybutadiene, natural rubber, and others, to obtain materials with enhanced toughness, tear strength, abrasion, antichunking, durability and foam cell strength.

Foamable Polymer

Polymer compositions in accordance may include one or more foamable polymers that can be foamed in the presence of a suitable foaming agent in any conventional foaming process employed for polymers. In one or more embodiments, foamable polymer may be selected from polymers such as ethylene vinyl acetate copolymer (EVA), polyethylene, polypropylene, polystyrene, polyurethane, elastomers as elastomeric EVA, 5-vinyl-2-norbornene-EPDM, polysulfide rubber, ethylene propylene rubber (EPM), poly(ethylene-methyl acrylate), poly(ethylene-acrylate), ethylene propylene diene rubber (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), styrene-ethylene-butylene-styrene triblock copolymer (SEBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber, chlorobutyl rubber, chlorinated poly(ethylene), vinylidene fluoride copolymers (CFM), silicone rubber, vinyl silicone rubber, chlorosulgonated poly(ethylene), fluoroelastomer, elastomeric polyolefins as ethylene C3-C12 alpha olefin copolymer and combinations thereof.

Foamable polymers may include EVA in some embodiments. EVA polymers in accordance with the present disclosure may include an amount of vinyl acetate monomer as a percent by weight of the copolymer measured according to ASTM D5594 that ranges from a lower limit selected from one of 5 wt %, 8 wt %, 12 wt %, and 20 wt % to an upper limit selected from 25 wt %, 33 wt %, and 40 wt %, where any lower limit may be paired with any upper limit. In some embodiment, the EVA can be derived from fossil or renewable sources, e.g., biobased EVA. Biobased EVA is an EVA wherein at least one of ethylene and/or vinyl acetate monomers are derived from renewable sources, such as ethylene derived from biobased ethanol.

Foamable polymers in accordance to the present disclosure may include an elastomeric ethylene vinyl acetate (EVA) composition prepared from of (A) EVA polymers as described above, (B) ethylene alpha-olefin copolymer, (C) polyorganosiloxane, (D) plasticizer, and (E) rubber. Elastomeric EVA compositions are prepared as disclosed in the Brazilian patent BR102012025160-4, incorporated herein in its entirety as reference. The major components of the elastomer composition of the present disclosure as well as their respective properties are detailed below.

(B) Ethylene Alpha-Olefin Copolymer

Elastomeric EVA compositions in accordance may incorporate one or more copolymers prepared from the polymerization of ethylene and a C3 to C20 alpha-olefin.

Ethylene alpha-olefin copolymer in accordance with the present disclosure may have a hardness determined in accordance with ASTM D2240 in a range having a lower limit selected from any of 10 Shore A, 15 Shore A. and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm3, 0.85 g/cm3, and 0.88 g/cm3, to an upper limit selected from any of 0.89 g/cm3, 0.90 g/cm3, and 0.95 g/cm3, where any lower limit may be paired with any upper limit.

Ethylene alpha-olefin copolymer in accordance with the present disclosure may have a melt flow index (MFI) at 190° C. and 2.16 kg as determined according to ASTM D1238 in a range having a lower limit selected from any of 0.01 g/10 min, 0.05 g/10 min, and 0.1 g/10 min, to an upper limit selected from any of 70 g/10 min, 75 g/10 min, and 100 g/10 min, where any lower limit may be paired with any upper limit.

Elastomeric EVA compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

Elastomeric EVA compositions in accordance may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents. The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

Elastomeric EVA compositions in accordance with the present disclosure may contain a polyorganosiloxane having a viscosity measured at 25° C. according to ASTM D428746 that ranges from a lower limit of 20 cP or 40 cP, to an upper limit of 700,000 cP or 900,000 cP, where any lower limit may be paired with any upper limit.

Elastomeric EVA compositions in accordance with the present disclosure may contain a polyorganosiloxane at a percent by weight (wt %) of the composition that ranges from a lower limit of 0.1 wt % or 0.5 wt %, to an upper limit of 5 wt % or 10 wt %, where any lower limit may be paired with any upper limit.

(D) Plasticizer

Elastomeric EVA compositions in accordance may incorporate a plasticizer to improve the processability and adjust the hardness of the elastomeric EVA. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3 gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Elastomeric EVA compositions in accordance with the present disclosure may contain a plasticizer at a percent by weight (wt %) of the composition that ranges from a lower limit of 0.5 wt % or 2 wt %, to an upper limit of 10 wt % or 20 wt %, where any lower limit may be paired with any upper limit.

(E) Rubber

Elastomeric EVA compositions in accordance may incorporate a rubber component to increase the rubbery touch and increase the coefficient of friction, depending on the end application. Rubbers in accordance with the present disclosure may include one or more of natural rubber, polyisoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isobutylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A. and 55 Shore A, where any lower limit may be paired with any upper limit.

Elastomeric EVA compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

In some embodiments, EVA may be VA4018R, SVT2180, SVT2145R, VA1518A, VA2510A, HM728, 3019PE, 8019PE, PN2021, HM150 and combinations thereof, which are commercially available by Braskem.

In one or more embodiments, foamable polymers in accordance with the present disclosure may have a melt flow index (MFI) ranging from 1 to 44 g/10 min (190° C. at 2.16 kg) as determined by ASTM D1238 prior to foaming, when applicable. In some embodiments, foamable polymers, prior to foaming, may have a Mooney Viscosity ranging from 10 to 150 (ML 1+4 at 125° C.) as determined by ASTM D1646, when applicable, such as when the polymer composition contains a rubber.

In one or more embodiments, polymer compositions in accordance with the present disclosure may contain a percent by weight of the total composition (wt %) of one or more foamable polymers that ranges from a lower limit selected from one of 1 wt %, 5 wt %, 12 wt %, 15 wt %, 30 wt %, 35 wt %, and 50 wt %, to an upper limit selected from one of 65 wt %, 70 wt %, 76 wt %, 85 wt %, 90 wt %, and 96 wt %, where any lower limit can be used with any upper limit.

In one or more embodiments, foamable polymers may include blends of EVA and other foamable polymers, wherein EVA is present as a percent by weight of the blend that ranges from a lower limit selected from one of 50 wt %, 60 wt %, 65 wt %, and 70 wt % to an upper limit selected from 75 wt %, 85 wt %, 90 wt % and 99 wt %, where any lower limit may be paired with any upper limit.

Ionomeric Additive

Polymer compositions in accordance with the present disclosure may include one or more ionomeric additives that may increase viscosity and improve foam cell formation during a polymer foaming process. Ionomeric additive is a molecule that includes electrically neutral units and a fraction of ionized units covalently bonded to the polymer backbone, wherein metal atoms neutralize the ionized units. In one or more embodiments, ionomeric additives is a metal centered carboxyl group-containing monomer.

In one or more embodiments, ionomeric additives may include organic acid metal salts, such as including but not limited to a fatty acid metal salt. The metal in the organic acid metal salt may be selected from metals with a valence of +1, +2 or +3. In some embodiments, the metal may include Al, Zn, Ca, Mg, Na, and Li. Organic acids that may be used to prepare organic acid metal salts include saturated and unsaturated, aromatic and non-aromatic acids.

Ionomeric additives may include a metal salt of unsaturated acids such as salts selected from acrylate, methacrylate, methyl acrylate, methylmethacrylate, ethyl acrylate, ethyl methacrylate, butyl acrylate, butyl methacrylate, 2-ethylhexyl acrylate, 2-ethylhexyl methacrylate, 2-methoxyethyl acrylate, 2-ethoxyethyl acrylate, ethoxyethoxyethyl acrylate, 2-phenyoxyethyl acrylate, 2-hydroxyethyl acrylate, 2-hydroxypropyl acrylate, 4-hydroxybutyl acrylate, isobutyl methacrylate, tert-butylmethacrylate, acrylonitrile, isobutyl acrylate, tert-butyl acrylate, or combinations thereof. In some embodiments, the ionomeric additive is selected from the group consisting of zinc diacrylate, zinc methacrylate, and combinations thereof.

Ionomeric additives in accordance with the present disclosure may also include metal salts derived from branched/linear, aromatic, saturated/unsaturated acids having a higher carbon number, including a carbon number within the range of C4 to C50. In some embodiments, the acids in accordance with the present disclosure may include linear fatty acids such as butyric acid, valeric acid, caproic acid, enthanic acid, caprylic acid, pelargonic acid, capric acid, undecylic acid, lauric acid, tridecyclic acid, mysristic acid, pentadecylic acid, palmitic acid, margaric acid, stearic acid, behenic acid, cerotic acid, and the like, in addition to unsaturated fatty acids such as myristoleic acid, palmitoleic acid, oleic acid, linoleic acid, alpha-linoleic acid, erucic acid, ricinoleic acid, and the like. In some embodiments, the ionomeric additive is chosen from zinc stearate, calcium stearate, magnesium stearate, and combinations thereof.

Ionomeric additives may also include metal salts derived from linear and branched, saturated and unsaturated C6-C36 fatty polyacids such as oxalic acid, malonic acid, glutaric acid, adipic acid, pimelic acid, suberic acid, azelaic acid, sebacic acid, undecanedioic acid, dodecandioic acid, tridecanedioic acid, tetradecanedioic acid, petadecanedioic acid, hexadecanedioic acid, citric acid, maleic acid, fumaric acid, and the like.

In one or more embodiments, polymer compositions in accordance with the present disclosure may contain a percent by weight of the total composition (wt %) of one or more ionomeric additives that ranges from a lower limit selected from one of 0.1 wt %, 0.5 wt %, 1 wt %, and 2 wt %, to an upper limit selected from one of 2.2 wt %, 2.5 wt %, 3 wt %, 3.5 wt %, and 4 wt %, where any lower limit can be used with any upper limit. The ionomeric additive may function as an agent that reduces foam shrinkage at lower concentrations that when ionomeric additives are employed as coagents for crosslinking, such as at concentrations greater than 10 to 35 wt %.

Foaming Agents

Polymer compositions in accordance with the present disclosure may include one or more foaming agents that are inducing the formation of a cellular structure in a foamable composition. Foaming agents may include solid, liquid or gaseous blowing agents. In embodiments utilizing solid foaming agents, foaming agents may be combined with a polymer composition as a powder or granulate.

The chemical blowing agents are usually decomposed at the processing temperatures, releasing the blowing gases (e.g., $N_2$, CO, $CO_2$). Examples of chemical blowing agents are organic blowing agents, such as azodicarbonamide, azobis(isobutyronitrile), diphenyl oxide-4,4'-disulfonic acid hydrazide and N-nitroso compounds. Inorganic chemical blowing agents are, e.g., sodium hydrogen carbonate or ammonium carbonate, frequently combined with weak organic acids such as citric acid. In a preferred embodiment, the foaming agent is selected from the group consisting of azodicarbonamide.

In one or more embodiments, polymer compositions may be formulated as a medium density foam using a chemical blowing agent. Chemical blowing agents in accordance with the present disclosure may include reagents that generate gaseous byproducts during curing of a polymerizable material. In one or more embodiments, suitable chemical blowing agents may include hydrazine such as toluenesulfonyl hydrazine, hydrazides such as oxydibenzenesulfonyl hydrazide, nitrates, azo compounds such as azodicarbonamide, cyanovaleric acid, and other nitrogen-based materials, sodium bicarbonate, and other compounds known in the art.

In one or more embodiments, polymer compositions in accordance with the present disclosure may contain a percent by weight of the total composition (wt %) of one or more foaming agents that ranges from a lower limit selected from one of 0.1 wt %, 0.5 wt %, 0.75 wt %, and 1 wt %, to an upper limit selected from one of 1 wt %, 2.5 wt %, 6 wt %, and 7.5 wt %, where any lower limit can be used with any upper limit.

In one or more embodiments, foamable polymer, ionomeric additive(s), and foaming agent are mixed concomitantly or in subsequent mixture steps in any conventional mixture device, including single- and multi-screw extruders, kneaders, banburys and the like. For example, the foamable polymer and the ionomeric additive can be mixed in a kneader and extruded to be pelletized in a first step, and in a second step, the foaming agent can be mixed through a second kneading step.

Peroxide Agents

Polymer compositions in accordance with the present disclosure may include one or more peroxide agents capable of generating free radicals during the polymer processing. Peroxide agents may include benzoyl peroxide, dicumyl peroxide, di-tert-butyl peroxide, tert-butyl cumyl peroxide, tert-butyl 3,5,5-trimethylhexanoate peroxide, tert-butyl peroxybenzoate, 2-ethylhexyl carbonate tert-butyl peroxide, 2,5-dimethyl-2,5-di (tert-butylperoxide) hexane, 1,1-di (tert-butylperoxide)-3,3,5-trimethylcyclohexane, 2,5-dimethyl-2,5-di(tertbutylperoxide) hexyne-3,3,3,5,7,7-pentamethyl-1,2,4-trioxepane, Butyl 4,4-di (tert-butylperoxide) valerate, di (2,4-dichlorobenzoyl) peroxide, di (4-methylbenzoyl) peroxide, peroxide di(tert-butylperoxyisopropyl) benzene, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol, 4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3, 2,5-dimethyl-2,5-di(t-amylperoxy)hexyne-3, 2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl] benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl) peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl}-1-methylethyl]carbamate, 1,3-dimethyl-3-(t-amylperoxy)butyl N-[1-(3(1-methylethenyl)-phenyl}-1-methylethyl]carbamate, 1,3-dimethyl-3-(cumylperoxy))butyl N-[1-{3-(1-methylethenyl)-phenyl}-1-methylethyl]carbamate, 1, 1-di(t-butylperoxy)-3,3,5-trimethylcyclohexane, 1, 1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1, 1, 1-tris[2-(t-butylperoxy-carbonyloxy)ethoxymethyl]propane, 1, 1, 1-tris[2-(t-amylperoxy-carbonyloxy)ethoxymethyl]propane, 1,1,1-tris[2-(cumylperoxy-cabonyloxy)ethoxymethyl]propane, OO-t-amyl-O-isopropylmonoperoxy carbonate, di, 4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

In one or more embodiments, polymer compositions in accordance with the present disclosure may contain a percent by weight of the total composition (wt %) of one or more peroxide agents that ranges from a lower limit selected from one of 0.01 wt %, 0.10 wt %, 0.15 wt %, 0.4 wt %, and 1 wt %, to an upper limit selected from one of 1 wt %, 2.5 wt %, 4 wt %, and 5 wt %, where any lower limit can be used with any upper limit. Further, it is envisioned that the concentration of the peroxide agent may be more or less depending on the application of the final material.

Crosslinking Coagents

Polymer compositions in accordance with the present disclosure may incorporate a crosslinking coagent containing two or more unsaturated moieties capable of copolymerization or graft polymerization with the foamable polymer or monomers or prepolymers thereof. Crosslinking coagents may include triallyl cyanurate, triallyl isocyanurate, triallyl trimellitate, triallyl trimesate, tetraallyl pyromellitate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris (hydroxymethyl)ethane di(meth)acrylate, 1,1,1-tris (hydroxymethyl)ethane tri(meth)acrylate, 1,1,1-tris (hydroxymethyl)propane di(meth)acrylate, 1,1,1-tris (hydroxymethyl)propane tri(meth)acrylate, diallyl phthalate, diallyl terephthalate, divinyl benzene, methylol (meth)acrylamide, triallylamine, and methylenebis(meth) acrylamide, and the like.

In one or more embodiments, polymer compositions in accordance with the present disclosure may contain a percent by weight of the total composition (wt %) of one or more crosslinking coagents that ranges from a lower limit selected from one of 0.01 wt %, 0.10 wt % and 0.15 wt % to an upper limit selected from one of 0.5 wt %, 0.75 wt % and 1 wt %, where any lower limit can be used with any upper limit.

Additives

Polymer compositions in accordance with the present disclosure may include fillers and additives that modify various physical and chemical properties when added to the polymer composition during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, inorganic fillers, organic and/or inorganic dyes, anti-blocking agents, processing aids, flame-retardants, plasticizers, biocides, and adhesion-promoting agents. Polymer composition in accordance with the present disclosure may be loaded with fillers that may include carbon black, silica powder, precipitated calcium carbonate, calcium carbonate, talc, titanium dioxide, clay, polyhedral oligomeric silsesquioxane (POSS), calcium carbonate, metal oxide particles and nanoparticles, inorganic salt particles and nanoparticles, and mixtures thereof.

Physical Properties

Polymer compositions modified with ionomeric additives may be used to prepare foams and foam articles that exhibit improved properties when compared to unmodified polymers.

Foams prepared from the polymer compositions in accordance with the present disclosure may have a Hardness Asker C as determined by ASTM D2240 within a range having a lower limit selected from one of 20, 25, 35, and 40 Asker C, to an upper limit selected from one of 70, 75, 80, and 90 Asker C, where any lower limit may be paired with any upper limit.

Foams prepared from the polymer compositions in accordance with the present disclosure may have a density as determined by ASTM D-792 within a range having a lower limit selected from one of 0.08 $g/cm^3$, 0.1 $g/cm^3$, and 0.25 $g/cm^3$, to an upper limit selected from one of 0.5 $g/cm^3$. 0.65 $g/cm^3$, 0.80 $g/cm^3$ and 1.0 $g/cm^3$, where any lower limit may be paired with any upper limit.

Foams prepared from the polymer compositions in accordance with the present disclosure may have a shrinkage at 70° C.*1 h using the PFI method (PFI "Testing and Research Institute for the Shoe Manufacturing Industry" in Pirmesens—Germany) within a range having a lower limit selected from one of 0.01%, 0.1%, 0.5%, and 1%, to an upper limit selected from one of 1.5%, 2%, 2.5% 3%, and 3.5%, where any lower limit may be paired with any upper limit.

Foams prepared from the polymer compositions in accordance with the present disclosure may have a permanent compression set (PCS) as determined by ASTM D395 Method B within a range having a lower limit selected from one of 1%, 2%, 5%, 10%, 20% and 40% to an upper limit selected from one of 50%, 60%, 70%, and 80%, where any lower limit may be paired with any upper limit.

Foams prepared from the polymer compositions in accordance with the present disclosure may have a rebound as determined by ASTM D3574 within a range having a lower limit selected from one of 20%, 30%, 35%, 40%, and 45%, to an upper limit selected from one of 50%, 60%, 70%, 80% and 90%, where any lower limit may be paired with any upper limit.

Preparation

Polymer compositions in accordance with the present disclosure may be prepared in any conventional mixture device. In one or more embodiments, polymer compositions may be prepared by mixture in conventional extruders like single screw or twin-screw extruders, kneaders or banbury mixers, in conventional polymer processing conditions using one or more ionomeric additives as a chemical modifier.

In one or more embodiments, polymer compositions may be prepared by methods that include: mixing organic peroxide with the foaming agent; separately combining the foamable polymer and the ionomeric additive, and optional components to form a polymer mixture; pouring the polymer mixture into an internal mixer to carry out first-stage internal mixing; adding the mixture of organic peroxide and the foaming agent to carry out second-stage internal mixing; thinning the second-stage mixture by a roller machine; and transferring the material from the roller machine to a granulator to be granulated. In some embodiments, the obtained polymer granules may be mixed according to a set multiplying power and injection molded into a final article such as an insole, where the article may be sized according to a foaming profile using a thermostat. Polymer compositions in accordance with the present disclosure may be formulated as a "masterbatch" in which the polymer composition contains concentrations of ionomeric additive that are high relative to the foamable polymer concentration in a final polymer or foam blend for manufacture or use. For example, a masterbatch stock may be formulated for storage or transport and, when desired, be combined with additional foamable or other materials in order to produce a final polymer composition having concentration of constituent components that provides physical and chemical properties tailored to a selected end-use.

In some embodiments, a polymer composition or masterbatch composition may be formulated to contain one or more foamable polymers and one or more ionomeric additives. The mixture of foamable polymer and ionomeric additive may then be stored or shipped and later formulated to contain a peroxide agent and/or foaming agent, and additives, prior to forming the final foamed polymer composition.

Applications

Polymer compositions in accordance with the present disclosure may be used in a number of molding processes including extrusion molding, injection molding, compression molding, thermoforming, foaming, rotomolding, pultrusion, 3D printing, and the like, to produce manufactured articles.

Polymer compositions and foams in accordance with the present disclosure may be formed into foamed articles having limited shrinkage properties when compared to conventional foams, including use in shoe soles and as midsoles, outsoles, unisoles, insoles, flip flops, sportive articles, automotive parts such as sealing systems, civil construction articles, among others. Other applications may include rigid and flexible packaging for food products, chemicals, agrochemicals, and the like.

EXAMPLE

In the following example, polymer foam formulations where prepared and assayed to study various physical properties. Polymer formulations are show in Table 1. FP 1 is a foamable polymer containing a polyethylene vinyl acetate copolymer having an 18 wt % vinyl acetate content; MFI 5 g 10 min$^{-1}$ (190° C.@2.16 kg); density 0.931 g cm-3; Hardness 71 Shore A (ASTM D2240). FP 2 is a foamable polymer containing a polyethylene vinyl acetate copolymer having 18 wt % vinyl acetate; MFI 15 g 10 min$^{-1}$ (190° C.@2.16 kg. (ASTM D1238)) density 0.928 g cm-3; Hardness 71 Shore A (ASTM D2240). FP 3 is a foamable polymer containing a polyethylene vinyl acetate copolymer having 28 wt % vinyl acetate; MFI 6 g 10 min-1 (190° C.@2.16 kg, (ASTM D1238)); density 0.950 g cm-3; Hardness 80 Shore A (ASTM D2240). FP 4 is a foamable polymer containing a polyethylene vinyl acetate copolymer having 19% vinyl acetate content; MFI 2.5 g 10 min-1 (190° C.@2.16 kg, (ASTM D1238)); density 0.940 g cm-3; Hardness 90 Shore A (ASTM D2240). FP 5 is a foamable polymer containing a polyethylene vinyl acetate copolymer having 20 wt % vinyl acetate content; MFI 150 g 10 min-1 (190° C.@2.16 kg, (ASTM D1238)); density 0.940 g cm-3; Hardness 83 Shore A (ASTM D2240). Polymer compositions where also formulated with zinc diacrylate, crosslinking coagent, slipping agent, zinc oxide, titanium dioxide, peroxide agent, crosslinking coagent, blowing agent, carbon black, and a portion of recycled EVA.

TABLE 1

Sample formulations assayed.

| Composition, wt % | C1 | F1 | F2 |
|---|---|---|---|
| FP 1 | 35.52 | 21.52 | — |
| FP 2 | — | — | 21.52 |
| FP 3 | 29.20 | 23.98 | 23.98 |
| FP 4 | 14.21 | 14.26 | 14.26 |
| FP 5 | — | 5.06 | 5.06 |
| zinc diacrylate | — | 0.21 | 0.21 |
| calcium carbonate | 11.84 | 8.85 | 8.85 |
| stearic acid | 0.79 | 0.32 | 0.32 |
| slipping agent | 0.00 | 0.76 | 0.76 |
| zinc oxide | 1.58 | 1.75 | 1.75 |
| titanium dioxide | — | 4.04 | 4.04 |
| peroxide agent | 1.42 | 1.20 | 1.20 |
| crosslinking coagent | — | 0.13 | 0.13 |
| blowing agent | 1.50 | 2.01 | 2.01 |
| carbon black | 3.95 | — | — |
| recycled EVA | — | 15.92 | 15.92 |

Samples were assayed for hardness, rebound, shrinkage, density and compression set, and the results are shown in Table 2.

TABLE 2

Various physical properties for sample formulations assayed

| Parameter | Units | C1 | F1 | F2 |
|---|---|---|---|---|
| Expansion rate | % | 50 | 55 | 55 |
| Hardness | Asker C | 49 | 51 | 52 |
| Rebound | % | 49 | 48 | 48 |
| Shrinkage | % | 3.5 | 0.7 | 0.8 |
| Density | g/cm$^3$ | 0.240 | 0.220 | 0.220 |
| Abrasion in 5N cell | % | 140 | 95 | 98 |
| Permanent Compression Set | % | 64 | 56 | 55 |

The comparison of Table 1 with Table 2 reveals that foamed polymer compositions in accordance with the present disclosure exhibit lower shrinkage over comparative formulation C1. These results show that it is possible to use zinc diacrylates as a polymer resin modifier prior to or during the foaming process to obtain foam articles having diminished or negligible shrinkage.

For the following examples, tests were performed varying the zinc diacrylate concentration as detailed in Table 3:

TABLE 3

Sample formulations assayed.

| Composition, wt % | C2 | F3 | F4 | F5 | F6 |
|---|---|---|---|---|---|
| VA4018R from Braskem | 87.3 | 72.1 | 76.6 | 81.0 | 85.8 |
| zinc diacrylate | — | 14.4 | 10.0 | 5.7 | 1.1 |
| calcium carbonate | 8.7 | 7.2 | 7.7 | 8.1 | 8.6 |
| stearic acid | 0.9 | 0.7 | 0.8 | 0.8 | 0.9 |
| zinc oxide | 0.4 | 0.4 | 0.4 | 0.4 | 0.4 |
| peroxide agent (Luperox ® 802G) | 1.3 | 1.4 | 1.4 | 1.6 | 1.6 |
| blowing agent (Azodicarbonamide) | 1.3 | 3.7 | 3.2 | 2.4 | 1.6 |

Samples were assayed for hardness, rebound, shrinkage, density and compression set, and the results are shown in Table 4.

TABLE 4

Various physical properties for sample formulations assayed

| Parameter | Units | C2 | F3 | F4 | F5 | F6 |
|---|---|---|---|---|---|---|
| Expansion rate | % | 55 | 50 | 52 | 54 | 50 |
| Hardness | Asker C | 41 | 60 | 54 | 48 | 43 |
| Rebound | % | 60 | 57 | 58 | 59 | 57 |
| Shrinkage | % | 4.3 | 11.5 | 9.3 | 8 | 1.6 |
| Density | g/cm$^3$ | 0.236 | 0.315 | 0.286 | 0.267 | 0.287 |
| Abrasion in 5N cell | % | 363 | 398 | 286 | 287 | 461 |
| Permanent Compression Set | % | 61 | 38 | 43 | 49 | 64 |

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A foam composition, comprising:
   one or more foamable polymers;
   one or more ionomeric additives;
   wherein the one or more foamable polymers comprise an elastomeric ethylene vinyl acetate (EVA) composition comprising an EVA polymer, an ethylene alpha-olefin copolymer, a polyorganosiloxane, a plasticizer, and a rubber;
   wherein the one or more ionomeric additives is a metal salt of acrylate, a metal salt of methacrylate, or combinations thereof;

wherein the one or more ionomeric additives are present at a percent by weight of the composition (wt %) in the range of 0.1 to 4 wt %; and wherein the foam composition exhibits shrinkage as determined at 70° C.*1 h according to the PH method between 0.1 and 3.5%.

2. The foam composition of claim 1, wherein the one or more ionomeric additives is zinc diacrylate.

3. The foam composition of claim 1, wherein the one or more foamable polymers are present at a percent by weight of the composition (wt %) in the range of 5 to 96 wt %.

4. The foam composition of claim 1, wherein the EVA polymer comprises a vinyl acetate content at a weight percent (wt %) of the EVA component ranging from 8 wt % and 40 wt %.

5. The foam composition of claim 1, wherein the one or more ionomeric additives are present at a percent by weight of the composition (wt %) in the range of 0.1 to 2.2 wt %.

6. The foam composition of claim 1, wherein the composition further comprises a peroxide agent at a percent by weight of the composition (wt %) in the range of 0.15 to 5 wt %.

7. The foam composition of claim 1, wherein the composition further comprises a foaming agent at a percent by weight of the composition (wt %) in the range of 0.5 to 7.5 wt %.

8. The foam composition of claim 1, wherein the foam composition has an Asker C hardness as determined by ASTM D2240 in the range of 35 and 90 Asker C.

9. The foam composition of claim 1, wherein the density of the foam composition as determined by ASTM D-792 is in the range of 0.08 and 1.0 g/cm$^3$.

10. The foam composition of claim 1, wherein the foam composition exhibits a permanent compression set as determined by ASTM D395 Method B between 1 and 80%.

11. The foam composition of claim 1, wherein the foam composition exhibits a rebound as determined by ASTM D3574 between 20 and 90%.

12. An article prepared from the foam composition of claim 1.

13. A method of preparing a polymer composition, the method comprising:

combining one or more foamable polymers and one or more ionomeric additives in a mixer to produce the polymer composition;

wherein the one or more foamable polymers comprise an elastomeric ethylene vinyl acetate (EVA) composition comprising an EVA polymer, an ethylene alpha-olefin copolymer, a polyorganosiloxane, a plasticizer, and a rubber;

wherein the one or more ionomeric additives is a metal salt of acrylate, a metal salt of methacrylate, or combinations thereof;

wherein the one or more ionomeric additives are present at a percent by weight of the composition (wt %) in the range of 0.1 to 4 wt %; and foaming the polymer composition to generate a polymer foam exhibiting shrinkage as determined at 70° C.*1 h according to the PH method of between 0.1 and 3.5%.

14. The method of claim 13, wherein adding one or more foamable polymers and one or more ionomeric additives to the mixer is performed in sequence.

15. The method of claim 13, wherein adding one or more foamable polymers and one or more ionomeric additives to the mixer is performed simultaneously.

16. The method of claim 13, wherein the produced polymer composition is a masterbatch composition and wherein the method further comprises adding the masterbatch composition to a second mixer and combining the masterbatch composition with a foamable polymer resin.

17. The method of claim 13, wherein the composition comprises EVA the one or more foamable polymers at a percent by weight of the composition (wt %) ranging from 5 wt % to 96 wt %.

18. The method of claim 13, wherein the EVA polymer comprises a vinyl acetate content at a weight percent (wt %) of the EVA component ranging from 8 wt % and 40 wt %.

19. The method of claim 13, wherein the one or more ionomeric additives is zinc diacrylate.

20. A polymer composition, comprising:

one or more foamable polymers;

one or more ionomeric additives;

wherein the one or more foamable polymers comprise an elastomeric ethylene vinyl acetate (EVA) composition comprising an EVA polymer, an ethylene alpha-olefin copolymer, a polyorganosiloxane, a plasticizer, and a rubber;

wherein the one or more ionomeric additives is a metal salt of acrylate, a metal salt of methacrylate, or combinations thereof; and wherein the one or more ionomeric additives are present at a percent by weight of the composition (wt %) in the range of 0.1 to 4 wt %.

21. The method of claim 13, wherein the one or more ionomeric additives are present at a percent by weight of the composition (wt %) in the range of 0.1 to 2.2 wt %.

22. The polymer composition of claim 20, wherein the one or more ionomeric additives are present at a percent by weight of the composition (wt %) in the range of 0.1 to 2.2 wt %.

* * * * *

UNITED STATES PATENT AND TRADEMARK OFFICE
CERTIFICATE OF CORRECTION

PATENT NO. : 11,015,035 B2  
APPLICATION NO. : 16/180978  
DATED : May 25, 2021  
INVENTOR(S) : Ana Paula Rodrigues Camilo et al.

Page 1 of 1

It is certified that error appears in the above-identified patent and that said Letters Patent is hereby corrected as shown below:

In the Claims

At Column 13, Claim 1, Line 5, the term "PH method" should read -- PFI method --.

At Column 13, Claim 4, Line 15, "from 8 wt% and 40 wt%" should read -- from 8 wt% to 40 wt% --.

At Column 14, Claim 13, Line 9, the term "PH method" should read -- PFI method --.

At Column 14, Claim 17, Line 21, "EVA the one or more" should read -- the one or more --.

At Column 14, Claim 18, Line 26, "from 8 wt% and 40 wt%" should read -- from 8 wt% to 40 wt% --.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*